United States Patent
Hernandez et al.

(10) Patent No.: US 7,734,743 B2
(45) Date of Patent: *Jun. 8, 2010

(54) METHOD TO ENABLE INFINIBAND NETWORK BOOTSTRAP

(75) Inventors: Carol B. Hernandez, Austin, TX (US);
Stephen D. Linam, Austin, TX (US);
John T. O'Quin, II, Austin, TX (US);
Mark W. Wenning, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 513 days.

This patent is subject to a terminal disclaimer.

(21) Appl. No.: 11/678,133

(22) Filed: Feb. 23, 2007

(65) Prior Publication Data

US 2008/0209450 A1    Aug. 28, 2008

(51) Int. Cl.
*G06F 3/00* (2006.01)
(52) U.S. Cl. ............... 709/222; 370/477; 710/5; 711/114
(58) Field of Classification Search ............ 709/222
See application file for complete search history.

(56) References Cited

U.S. PATENT DOCUMENTS

| | | |
|---|---|---|
| 6,345,294 B1 | 2/2002 | O'Toole et al. |
| 6,466,985 B1 | 10/2002 | Goyal et al. |
| 6,757,723 B1 | 6/2004 | O'Toole et al. |
| 6,857,069 B1 | 2/2005 | Rissmeyer et al. |
| 6,895,590 B2 * | 5/2005 | Yadav .................. 719/328 |
| 7,155,537 B1 * | 12/2006 | Weber et al. ............ 709/249 |
| 7,398,337 B2 * | 7/2008 | Arndt et al. ............. 710/37 |
| 2003/0126242 A1 * | 7/2003 | Chang .................. 709/222 |
| 2003/0145045 A1 * | 7/2003 | Pellegrino et al. ........ 709/203 |
| 2003/0221042 A1 * | 11/2003 | Watkins et al. .......... 710/316 |
| 2004/0078679 A1 * | 4/2004 | Cagle et al. ............. 714/36 |

(Continued)

FOREIGN PATENT DOCUMENTS

EP    1708422 A2    10/2006

(Continued)

OTHER PUBLICATIONS

R. Droms, "Dynamic Host Configuration Protocol", Mar. 1997, pp. 1-45, Bucknell University.

(Continued)

*Primary Examiner*—Wing F Chan
*Assistant Examiner*—Kostas Katsikis
(74) *Attorney, Agent, or Firm*—Dillon & Yudell LLP (57) ABSTRACT

Firmware of an InfiniBand (IB) host computer device provides a representation of an IB Host Channel Adapter (HCA) within the hierarchical data structure during system initialization. An ib-boot support package encapsulates arguments for booting over an IB network using an ibport device. The ib-boot support package supports use of one or more command keywords, each identifying a specific type of support package utilized to retrieve the boot image. When the srp keyword is provided, an SRP protocol is used to access the storage boot device and retrieve the boot file. Access to the boot server is thus provided via one of the support packages, and the boot image is returned to the host device via the IB network for completion of boot operations.

17 Claims, 5 Drawing Sheets

U.S. PATENT DOCUMENTS

| | | | |
|---|---|---|---|
| 2004/0210649 A1 | 10/2004 | Bhogal et al. | |
| 2005/0138346 A1 | 6/2005 | Cauthron | |
| 2005/0216715 A1 | 9/2005 | Matheny et al. | |
| 2006/0002427 A1* | 1/2006 | MacInnis et al. | 370/477 |
| 2006/0013251 A1* | 1/2006 | Hufferd | 370/466 |
| 2006/0015655 A1* | 1/2006 | Zur et al. | 710/5 |
| 2006/0205388 A1* | 9/2006 | Semple et al. | 455/411 |
| 2006/0251257 A1* | 11/2006 | Haverinen et al. | 380/270 |
| 2006/0256736 A1 | 11/2006 | Koehler et al. | |
| 2007/0204103 A1* | 8/2007 | Wilkinson et al. | 711/114 |

FOREIGN PATENT DOCUMENTS

| | | |
|---|---|---|
| JP | 2005071242 | 3/2005 |

OTHER PUBLICATIONS

M. Chadalapaka, "Internet Small Computer Systems Interface", Apr. 2004, pp. 1-211, The Internet Society.

D. Missimer, "Bootstrapping Clients Using the Internet Small Computer System Interface (iSCSI) Protocol", Sep. 2005, pp. 1-12, The Internet Society.

"Open Firmware Recommended Practice: TFTP Booting Extension Version 1.0", Aug. 22, 2006, Open Firmware Working Group, http://playground.sun.com/1275/practice/obp-tftp/tftp1_0.pdf.

"PowerPC Microprocessor Common Hardware Reference Platform (CHRP) Binding (Accepted version 1.8, Feb. 2, 1998)", Feb. 2, 1998, Open Firmware Working Group, http://playground.sun.com/1275/home.html#OFDplatCHRP.

Office Action mailed on Jun. 25, 2009 for U.S. Appl. No. 11/678,124 entitled "Method to Enable InfiniBand Network Bootstrap".

Office Action mailed on Jul. 6, 2009 for U.S. Appl. No. 11/678,132 entitled "Method to Add IPV6 and DHCP Support to the Network Support Package".

* cited by examiner

METHOD TO ENABLE INFINIBAND NETWORK BOOTSTRAP

RELATED APPLICATIONS

The present application is related to the subject matter of commonly assigned, co-pending U.S. patent applications: Ser. No. 11/678,116; Ser. No. 11/678,124; and Ser. No. 11/678,132. Relevant content of the above related applications are incorporated herein by reference.

BACKGROUND OF THE INVENTION

1. Technical Field

The present invention generally relates to computer systems and in particular to networked computer systems. Still more particularly, the present invention relates to remote network boot operations for computer systems.

2. Description of the Related Art

Network computer systems are generally known in the computer arts. Also known is the general method for loading a boot image/file of a computer system from a remote server located across a network utilizing the Trivial File Transfer Protocol (TFTP). In particular, when booting a computer system (i.e., a network device) over a network, such as a local area network (LAN), the computer system's firmware typically utilize the TFTP bootstrap method to obtain the boot file from a boot server/device across the network.

With this TFTP bootstrap method, a network support package is provided to assist with the network boot operation. Specifically, the network support package utilizes the TFTP bootstrap method to retrieve and/or define specific boot arguments required to access and retrieve the boot image/file at the boot server. The network support package also processes the boot arguments obtained from the computer system and establishes a connection with the remote server to obtain the boot file. General information about the utilization of the network support package to enable loading of a boot image from a boot server located across a LAN via TFTP bootstrap may be found within Open Firmware Recommended Practice: TFTP Booting Extension Version 1.0, which is published by the Open Firmware Working Group.

While the above TFTP boot strap method is applied to and works well within standard LAN-based and other similarly configured networks, such methods have proven to not be effective with different network configurations or network-types. For example, the TFTP bootstrap method does not work with an InfiniBand (IB) network. See comments to disclosure 582.

As is known in the art, an InfiniBand (IB) network is a packet-switched, narrow parallel network, operating at a high data rate and at a large physical range, to interconnect remote devices to a host computer system (or server). The IB network comprises a host channel adapter (HCA), which couples the host computer system to a subnet. The network further comprises one or more target channel adapters (TCAs), which in turn couple other devices to the subnet. The subnet typically includes at least one switch and a plurality of links that connect the HCA and the TCAs to the switch(es). As an example, a simple IB network may have one switch, to which the HCA and the TCAs connect through respective links.

IB networks are often connected to local or wide area communication networks via adapters and routers. For example, an Ethernet network adapter may be utilized to enable communication over an Ethernet network. The network adapter has its own TCA, serving as an end node within the IB network for coupling to the Ethernet network. The IB specification further provides a raw datagram mode of communication to bridge packets received from an Ethernet network for transmission over an IB network, and vice-versa. Similarly, IB networks may include routers or adapters to connect to the Internet.

Given the increasing reliance on remote boot operations to complete the booting of computer devices, and the growing complexity of new networks such as an IB network, there is a need for expanding the remote boot process completed within a LAN to enable a host computer to complete a remote boot process from a boot server located across the IB network. There is presently no Open Firmware support to seamlessly perform a network boot operation via the standard network boot process of a network device connected to an IB fabric, where the boot device is connected directly to the IB fabric or to an external network coupled to an end node of the IB fabric.

SUMMARY OF THE INVENTION

Disclosed is a method and system for enabling an InfiniBand (IB) host computer device to boot an operating system from a remote storage device over the IB network. The device's firmware is enhanced to provide a representation of an IB Host Channel Adapter (HCA) within the hierarchical data structure that represents the computer device's hardware. Accordingly, a new device type is defined, the "hca" device type, which represents an IB HCA. The hca device is characterized in the hierarchical firmware data structure by a node global unique identifier (node-GUID). The hca device contains interfaces to open and close the device and read from and write to the device. The "hca" device may have one or more "children", which are referred to as "ibport" devices and are identified by the port global unique identifier (port-GUID). In addition to the open, close, read, and write interfaces defined for the parent hca device, an ibport device includes a load interface to enable the device to be used as a boot device.

An "ib-boot" support package is provided, and a set of boot arguments is defined to be utilized by the ib-boot support package. The ib-boot support package received the boot arguments that specify the target IB end node along with a specific keyword. The hierarchical nature of the firmware structure is utilized to pass these IB-specific arguments, based on the specified keyword, to the appropriate support package to complete the boot processing. The ib-boot support package also implements specific packet transfer protocols, which are utilized by hca device drivers when booting over an IB network.

In one embodiment, a specific keyword is provided, which identifies a SCSI (Small Computer System Interface) RDMA (Remote Direct Memory Access) Protocol—SRP—support package. The SRP support package specifies that the storage boot method is to be implemented, whereby the SRP is utilized to transmit SCSI commands over the IB fabric and access the boot device. The host device then reads blocks of data, including a boot image, from the storage device (boot server) connected to the I/O fabric though a channel adapter. Access to the boot server is thus provided via the SRP support package, and the boot image is returned to the host device via the IB network for completion of the host device's boot operation.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and system for enabling an InfiniBand (IB) host computer device to boot an operating system from a remote storage device over the IB network. The device's firmware is enhanced to provide a representation of an IB Host Channel Adapter (HCA) within the hierarchical data structure that represents the computer device's hardware. Accordingly, a new device type is defined, the "hca" device type, which represents an IB HCA. The hca device is characterized in the hierarchical firmware data structure by a node global unique identifier (node-GUID). The hca device contains interfaces to open and close the device and read from and write to the device. The "hca" device may have one or more "children", which are referred to as "ibport" devices and are identified by the port global unique identifier (port-GUID). In addition to the open, close, read, and write interfaces defined for the parent hca device, an ibport device includes a load interface to enable the device to be used as a boot device.

An "ib-boot" support package is provided, and a set of boot arguments is defined to be utilized by the ib-boot support package. The ib-boot support package received the boot arguments that specify the target IB end node along with a specific keyword. The hierarchical nature of the firmware structure is utilized to pass these IB-specific arguments, based on the specified keyword, to the appropriate support package to complete the boot processing. The ib-boot support package also implements specific packet transfer protocols, which are utilized by hca device drivers when booting over an IB network.

In one embodiment, a specific keyword is provided, which identifies a SCSI (Small Computer System Interface) RDMA (Remote Direct Memory Access) Protocol—SRP—support package. The SRP support package specifies that the storage boot method is to be implemented, whereby the SRP is utilized to transmit SCSI commands over the IB fabric and access the boot device. The host device then reads blocks of data, including a boot image, from the storage device (boot server) connected to the I/O fabric though a channel adapter. Access to the boot server is thus provided via the SRP support package, and the boot image is returned to the host device via the IB network for completion of the host device's boot operation. In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is also understood that the use of specific parameter names are for example only and not meant to imply any limitations on the invention. The invention may thus be implemented with different nomenclature/terminology utilized to describe the above parameters, without limitation.

Figure 1:
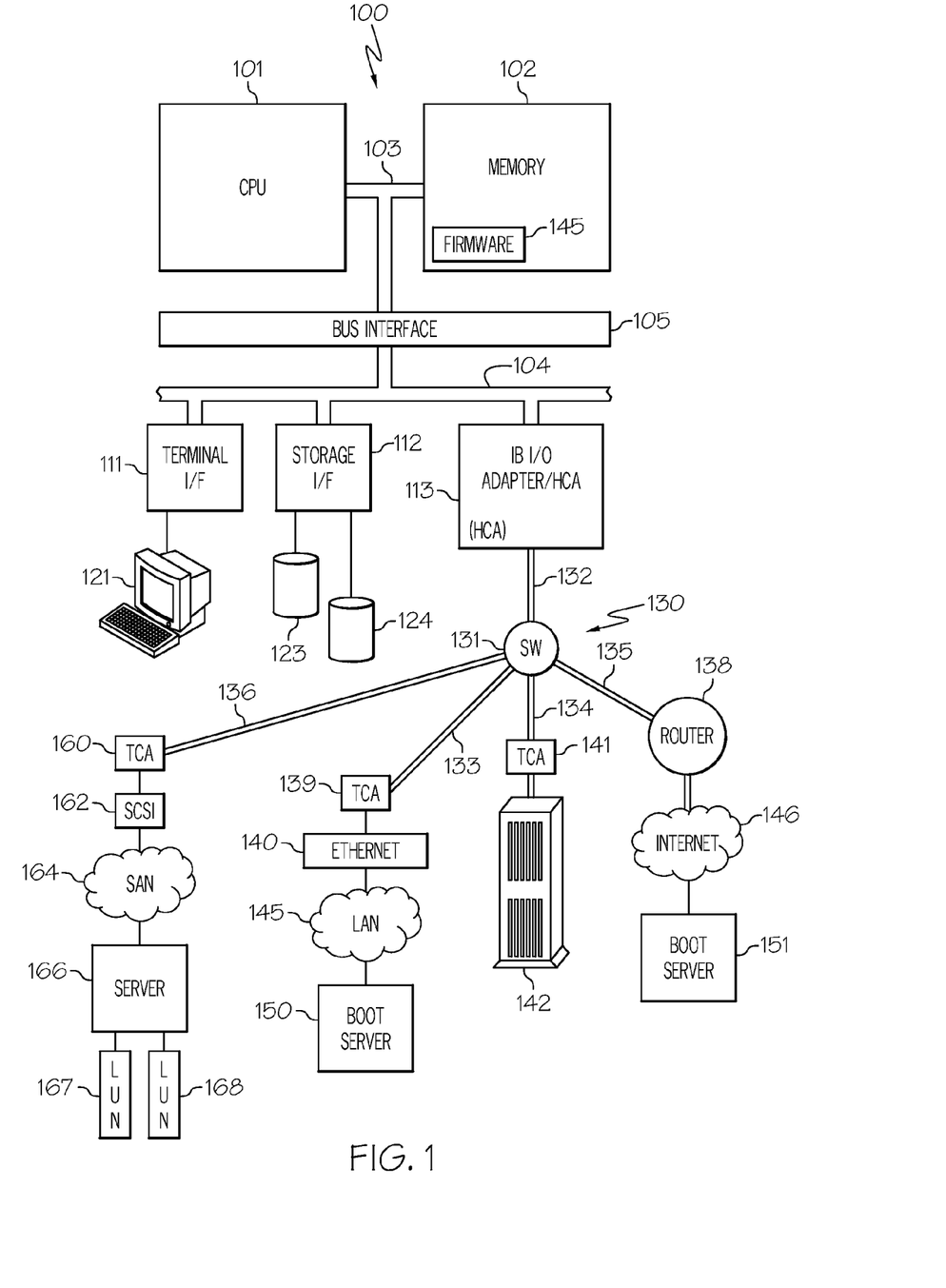
FIG. 1 is a high-level block diagram of the major hardware components of a host computer device within an InfiniBand (IB) network, according to one embodiment of the present invention.

With reference now to the figures, FIG. 1 provides a high-level representation of the major hardware components of a networked computer system utilizing an InfiniBand (IB) network connection for communicating with various peripheral and networked devices, including one or more remote boot servers, according to the described embodiments of the present invention. As shown, computer system 100, which is interchangeably referred to herein as the host computer or host computer device within the IB network, comprises central processing unit (CPU) 101 coupled to memory 102 via memory bus 103, which in turn provides connection to various other peripheral or network devices via input/Output (I/O) bus interface 105. CPU 101 is a general-purpose programmable processor which executes instructions and processes data from main memory 102. Main memory 102 may be a dynamic random access memory (DRAM) in which data is loaded from storage (123/124) for processing by CPU 101.

Memory bus 103 provides a data communication path for transferring data between CPU 101, main memory 102 and I/O bus interface 105. I/O bus interface 105 is further coupled to system I/O bus 104 for transferring data to and from various I/O units. I/O bus interface 105 communicates with multiple I/O interface units 111-113, which are also known as I/O processors (IOPs) or I/O adapters (IOAs), through system I/O bus 104. System I/O bus 104 may be an industry standard PCI bus or any other appropriate bus technology. The I/O interface units support communication with a variety of storage and I/O devices. For example, terminal interface unit 111 supports the attachment of one or more user terminals 121-122. Storage interface unit 112 supports the attachment of one or more direct access storage devices (DASD) 123-124 (which may represent a redundant array of independent disks (RAID) memory, configured to appear as a single large storage device to a host computer). Various other types of I/O devices (not shown) may be attached to I/O interface units, such as tape drives, printers, and network transceivers.

According to one embodiment of the invention, one of the I/O interface units is IB I/O adapter/HCA 113, which is interchangeably referred to herein as the host channel adapter (HCA) since IB I/O adapter/HCA 113 enables host computer 100 to connect to the IB network. The HCA is a programmable DMA (direct memory access) engine, which generates and consumes packets.

IB I/O adapter 113 supports a connection to InfiniBand network 130, which comprises switch 131 and multiple point-to-point connections 132-135. The InfiniBand network is a local network which may be used to connect to a variety of devices. As illustrated, InfiniBand network 130 provides connection to other computer systems, such as IB-boot server 142 to switch 131 via target channel adapter (TCA) 141. InfiniBand network 130 also provides connection to routers or adapters, which in turn couple InfiniBand network 130 to other local or wide area networks. In the exemplary embodiment of FIG. 1, TCA 139 connects to local area network (LAN) 145 via Ethernet adapter 140. LAN 145 provides access to remote boot server 150. Also, router 138 connects to Internet 140, which provides access to second remote boot server 151. As provided herein, the components of computer system 100, apart from InfiniBand I/O adapter (HCA) 113 and the connected IB network 130, are also referred to herein as the "host computer", to distinguish the host device that requires a boot OS from a boot server located across IB network 130. As illustrated, two external networks are provided, namely LAN 145 and Internet 140. Access by host device 100 to Internet 140 and LAN 145 are described as occurring at an "end node" of IB network 130, such as TCA 139.

In addition to the above components, IB network 130 further includes third TCA 160 to which is connected SCSI device 162. Connected to SCSI device 162 is storage area network (SAN) 164, which includes storage server 166. Storage server 166 further comprises one or more child devices, referred to herein as logical units (LUNs) 167/168, and connected to storage server 166. At least one LUN 167/168 contains a boot image that is utilized to boot host computer 100. Data, including the boot image, stored on LUNs 167/168 may be accessed via a disk support package, as described below. Thus, remote boot operations are supported via a storage device (LUN 167/168) attached to a remote IB node (third TCA 160) directly or through storage area network 164.

Although IB network 130 is shown in FIG. 1 having a single switch 131 and five connections 132-136 to respective digital devices, it is understood that an IB network may have a different number of switches, adapters, routers and links (but may have no switches or routers). The topology of an IB network may be considerably different and more complex, and thus a different number or types of devices may be coupled to an IB network.

It should be understood that FIG. 1 is intended to depict the representative major components of computer system 100 at a high level and that individual components may have greater complexity that represented in FIG. 1. It is further appreciated that components other than or in addition to those shown in FIG. 1 may be present, and that the number, type and configuration of such components may vary. FIG. 1 is thus presented solely by way of example and not intended to imply any limitations on the invention.

The present invention enables a remote boot process for computer device 100 connected to IB network 130 via a boot process occurring across IB network 130. One embodiment of the invention enables completion of a network boot process over the IB fabric, namely a storage boot method. The storage boot method involves connecting to a storage device (e.g., LUN 167/168) located at a remote IB end node and using a transport protocol such as SRP to obtain the boot file.

As described in greater detail herein, a specific storage boot method is supported by computer device 100 within the overall implementation of remote boot operations. The storage boot method involves connecting to a storage device (LUN 167/168) attached to a remote IB node (second TCA 160) directly or through SAN 164, and sending storage protocol commands, such as the SCSI (Small Computer System Interface) RDMA (Remote Direct Memory Access) Protocol (SRP), over the IB fabric.

Within the above example computer system and network environment, a first aspect of the invention involves modifying the system firmware to enable the firmware to identify and represent IB end nodes within the hierarchical structure generated by system firmware during system initialization in a way that enables the IB end nodes to be used for booting operations. Following power-on (or reboot) of a computer system, the system undergoes a boot process by which the system's firmware prepares the system for operation by identifying and setting up/initiating devices in the system. During the boot process, the firmware represents system hardware as a hierarchy of interconnected buses with attached devices. This hierarchical representation describes user configuration choices, and contains firmware device drivers for hardware devices and support routines for use by those drivers.

Within an IB network, the host system's boot firmware is enhanced to recognize the presence of the IB HCA and one or more IB-end node devices. According to one embodiment, a new device type is defined as the "hca" device type, which represents an IB HCA. The hca device is characterized in the hierarchical firmware data structure by a node global unique identifier (node-GUID). The hca device contains interfaces to open and close the device and read from and write to the device. The hca device includes several "children", which are referred to as "ibport" devices and are identified by the port global unique identifier (port-GUID). In addition to the open, close, read, and write interfaces defined for the parent hca device, an ibport device includes a load interface to enable the device to be used as a boot device.

A second related aspect of the invention involves the creation and utilization of command keywords, which are added to the boot arguments generated by system firmware during system initialization. In one embodiment, the command keyword specifies a packet transfer protocol and an associated set of arguments. These command keywords are understood by the ib-boot support package, which receives the boot arguments from the system firmware. The command keywords modify the boot arguments associated with a bootstrap method by specifying a specific network boot method to be undertaken. According to the described embodiments, the command keyword is the first argument in the boot arguments, and only one command keyword may be specified at a time. As further described below, in one embodiment, all command keywords are mutually exclusive, and thus, only one of the keywords is added before the standard boot arguments to enable IB-level remote boot operations. If more than one command keyword is specified, a failure results with a warning message sent to the user of the host computer device and the device does not open.

A specific network boot method is selected by using a command keyword in the arguments of the open interface for the ib-boot support package. The command keyword specifies a packet transfer protocol and an associated set of arguments. Use and/or application of several of the command keywords are described in the related application, Ser. No. 11/678,124, which has been previously incorporated herein by reference. In one embodiment of the invention, the command keyword "srp" is defined to select the storage boot method, and use of SRP provides specific boot functionality.

The srp keyword specifies the storage boot method, which when specified, triggers use of the SCSI RDMA Protocol (SRP) to transmit SCSI commands over the IB fabric and access the boot device (LUN 167/168 of FIG. 1). The booting platform (i.e., the host device) reads blocks of data from a storage device connected to the IB fabric through a channel adapter. When the storage method is specified, a set of IB-specific boot arguments are provided and are followed by disk-related arguments. The disk-related arguments are passed through by the ib-boot open method to the disk support package. Utilization of disk arguments are described in *PowerPC Micro-processor Common Hardware Reference Platform (CHRP) Binding*, published by the Open Firmware Working Group, relevant content of which is incorporated herein by reference.

According to one embodiment of the invention, the boot arguments for an SRP boot are as follows:
open ibport-device: iocguid=IOC-GUID, portgid=IOC-GID, srp, srpiport=init-portid, srptport=target-port-id, tlun=target-lun, disk-label args Within the above boot arguments, a description of the specific arguments includes:
(a) iocguid=IOC-GUID: which is a 64-bit globally unique EUI-64 compliant identifier that identifies the target I/O controller or I/O unit;
(b) portgid=IOC-GID: which is a 128-bit number that identifies a port in the target I/O unit. The argument is expressed in IPv6 format and the argument is made out of a 64-bit GID prefix and the 64-bit port GUID assigned to the I/O controller;
(c) srpiport=init-port-id: which is a 128-bit number that uniquely identifies the SRP initiator port. This number contains the GUID for the initiator port and a 64-bit number that ensures that all SRP initiator port identifiers are unique;
(d) srptport=target-port-id: which is a 128-bit number that uniquely identifies the SRP target port. This number contains the GUID for the target I/O controller and the service ID of the target port; and
(e) tlun=target-lun: which is a 64-bit logical unit number of the SRP target device.

As provided herein, IOC-GUID and IOC-GID uniquely identify the end_node in the InfiniBand fabric. The ib-boot process establishes a connection with the target I/O controller or End_node and then utilizes the protocol specified through the command keywords to send packets over the IB transport. Examples of the network-related arguments (network-args) are described in related patent application, Ser. No. 11/678, 124, previously incorporated herein by reference.

A third aspect of the invention involves the extension of an ib-boot support package to enable seamless connection to an SRP network boot process in addition to the IPoIB network boot process or the SDP network boot process from a remote boot device. The ib-boot support package is provided to assist in encapsulating arguments for booting over an IB network using an ibport device, and a set of boot arguments is defined to be utilized by the ib-boot support package. The ib-boot support package processes the boot arguments that specify the target IB end node (i.e., a TCA or router or adapter coupled to the IB fabric and to which the boot server connects, either directly or via a network). In one embodiment, the ib-boot support package also implements specific packet transfer protocols, typically utilized by hca device drivers, which are utilized when booting over an IB.

The hierarchical nature of the firmware structure is utilized to pass these IB-specific arguments, based on the specified keyword as processed by the ib-boot support package, to the appropriate support package to initiate retrieval of the boot image. Thus, when the keyword provided with the boot arguments is srp, the ib-boot support package passes the boot arguments to an SRP support package. Alternatively, and as described in the related applications, the keyword may specify use of a network support package to complete a network boot method, or the ib-boot support package may pass the boot arguments to an SDP support package to complete an IB-network boot.

Figure 2:
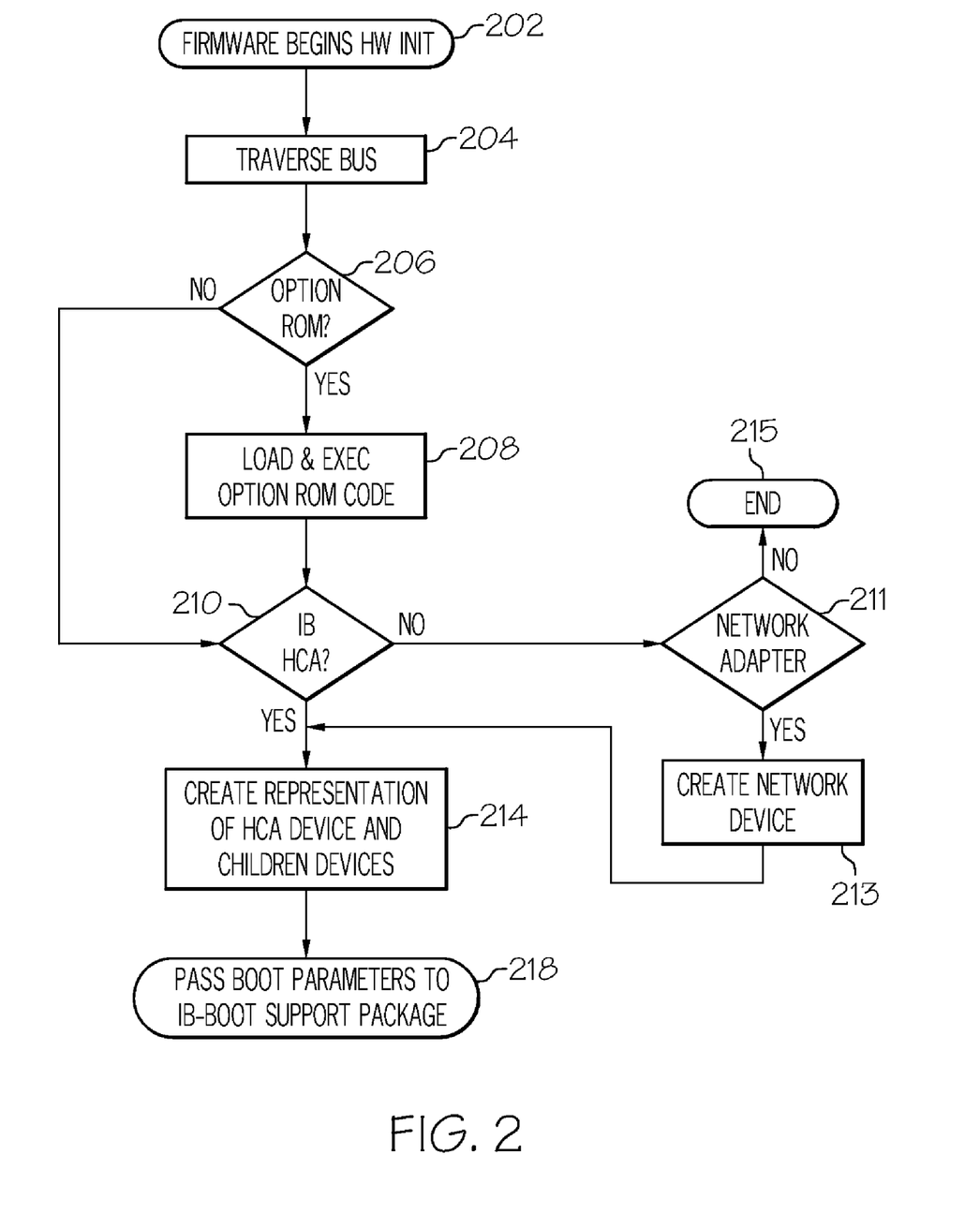
FIG. 2 illustrates an example process flow by which system firmware of computer system processes boot arguments that are transmitted to an ib-boot support package, according to one aspect of the invention.

FIG. 2 is a flow chart depicting the process by which the system firmware discovers the IB HCA and represents the device and its children within the hierarchical topology, according to one embodiment of the invention. The processes of FIG. 2 are described with reference to the system components shown in FIG. 1. The process begins at block 202, at which hardware initialization is initiated on a host system such as host system 100 (FIG. 1) by firmware such as system firmware 145 (FIG. 1). During system initialization, system firmware 145 traverses the system buses and identifies the I/O topology of host system 100, as shown at block 204. If, at decision block 206, an option ROM is detected in any of the devices attached to the bus, the option ROM is loaded and its code executed, as shown at block 208. As a result of executing the code, a representation of the device is created and added to the main hierarchical I/O topology, as shown at block 214.

If, at decision block 206, an option ROM is not detected, system firmware 145 determines at block 210 whether an IB HCA (or "hca" device) is detected. If an IB HCA device is detected, system firmware 145 creates a representation of the hca device along with its children ibport devices, as shown at block 212. System firmware 145 also creates a device representation of the location of the ibport devices within the I/O topology, as indicated at block 214. If, at decision block 210, no IB HCA is detected, then the process ends, as provided at block 211. Because an "ibport" device is opened with a specific set of boot arguments, system firmware 145 obtains the boot arguments required to open the ibport devices, as shown at block 216. System firmware then passes the boot arguments to the ib-boot support package for processing, as indicated at block 218.

Figure 3:
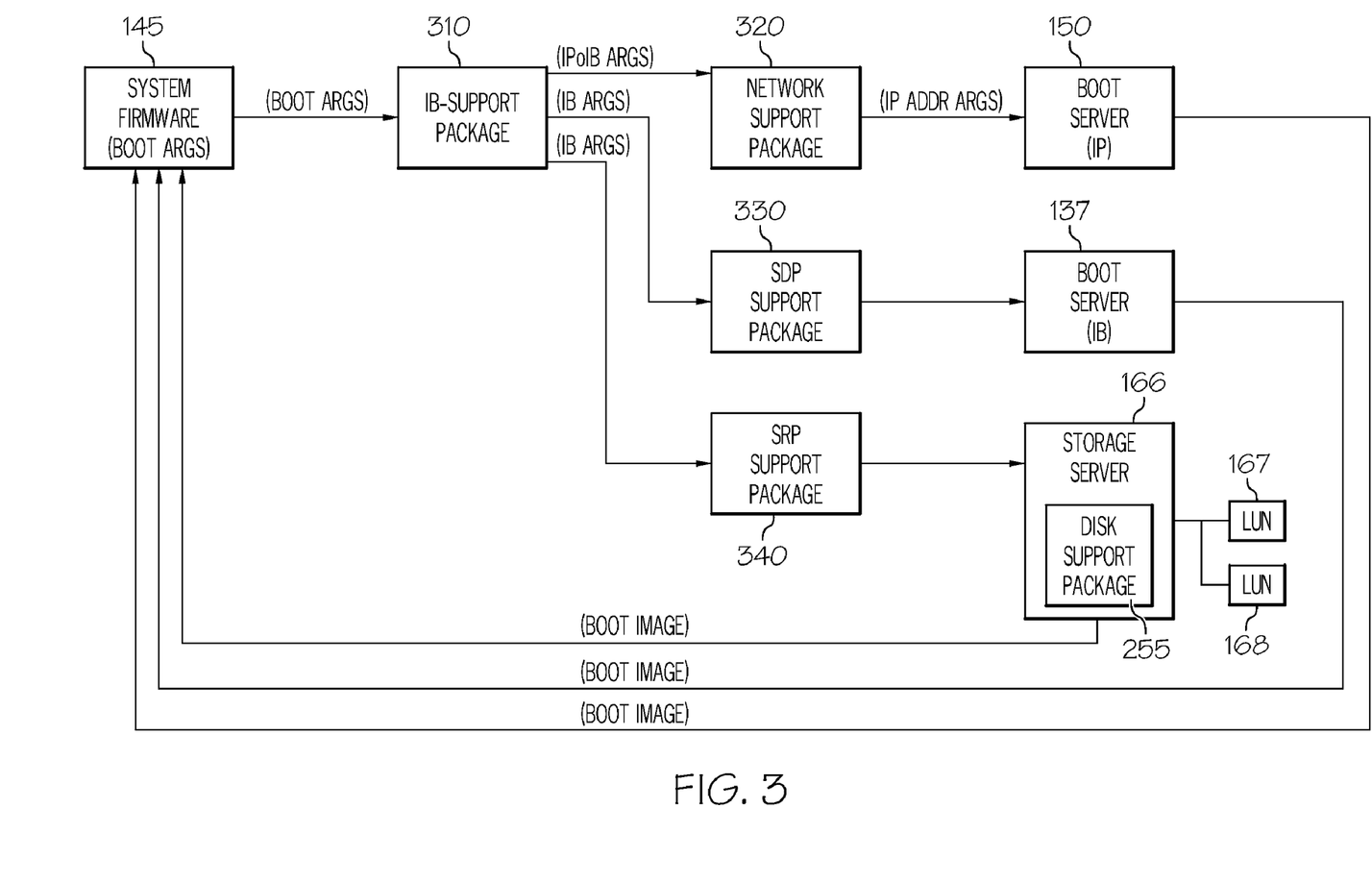
FIG. 3 is a block diagram illustrating interconnected functional components (hardware, firmware, and software structure) that collectively enable remote booting over an IB network via support packages, including an SRP support package, according to one embodiment of the invention.

Turning now to FIG. 3, which provides a block diagram representation of an example system, with primary components (hardware and software utility) that enable the utilization of IB boot arguments by an IB boot support package to enable SRP boot or IBoIP boot or SDP boot from a remote boot device, according to one illustrative embodiment of the invention. As shown, system firmware 145 (FIG. 1) of the device being booted, e.g., host system 100 (FIG. 1), is communicatively coupled to ib-boot support package 310. The ib-boot support package establishes a connection with the target I/O controller specified in the boot arguments. When booting from an IB-connected boot device, ib-boot support package 310 transmits SDP boot arguments to SDP support package 330, which utilizes SDP network protocol to get the boot file from boot server 137. When booting from a server connected via an IP network, ib-boot support package 310 forwards the IPoIB boot arguments to enhanced network support package 320. Finally, when booting from a LUN (or other device) connected to a server, which is in turn connected to a TCA either directly or via a SAN, ib-boot support package 310 forwards the SCSI boot arguments to SRP support package 340.

SRP support package 340 is shown connected to storage server 166, which has LUNs 167/168 connected thereto. Within server 166 is disk support package 170, which is utilized to receive boot arguments, access the appropriate one of LUNs 167/168 and retrieve the boot image/file from one of LUNs 167/168. The retrieved boot image/file is then provided to host system firmware 145 via IB network.

The SRP support package assists in sending SCSI commands over IB links to get to the storage server, and the SRP support package then transfers control to disk support package. Disk support package completes the actual loading of the boot image from the remote SCSI disk (LUN 148).

IP boot server 150 and IB boot server 166 are capable of providing the boot image to system firmware 145 of computer system 100 (FIG. 1) to enable computer system 100 to complete a boot operation. Servers 150 and 137 receive respective sets of boot arguments from network support package 320 and SDP support package 330, respectively. However, network support package 320 receives the arguments via IPoIB messages and transmits IPoIB messages, which is a different type/format of message transmission than that supported by SDP support package 330, namely IB messages.

Figure 4:
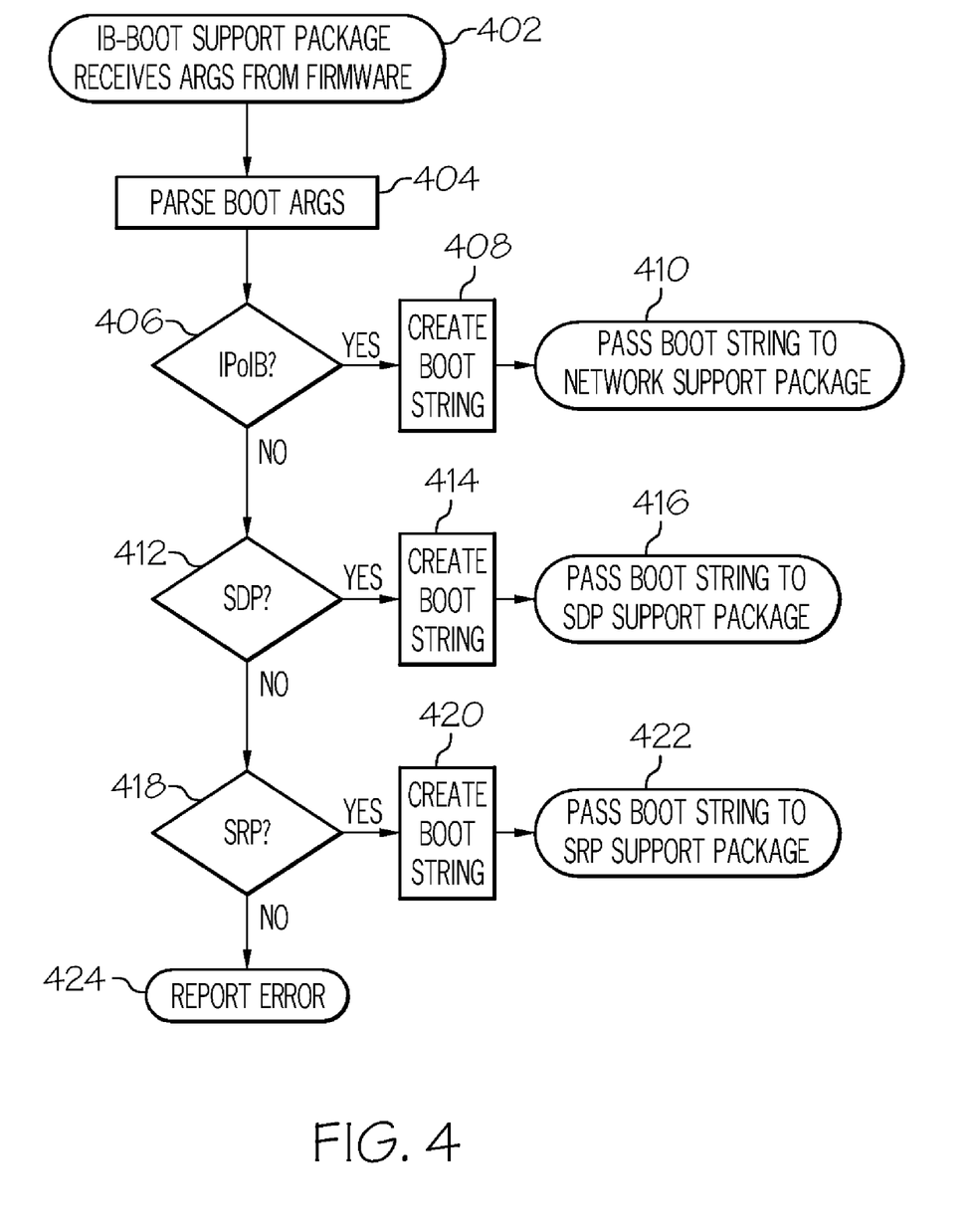
FIG. 4 illustrates an example process flow by which an ib-boot support package processes boot arguments and selects a SCSI (Small Computer System Interface) RDMA (Remote Direct Memory Access) Protocol—SRP—support package to forward the boot arguments for completion of the remote boot processing, in accordance with one embodiment of the invention.

FIG. 4 depicts the flow of boot arguments between the ib-boot support package and the other three support packages, selected depending on the command keyword included within the boot arguments. The ib-boot support package provides the boot arguments that specify the target IB end node. Specifically, with respect to the present invention, the flow chart of FIG. 4 depicts the flow of information between ib-boot package and the SRP support package when the storage network method is selected. The ib-boot package transfers control to the SRP support package to leverage the transport of SCSI commands through remote direct memory access (RDMA) interfaces.

The hierarchical nature of the firmware structure is utilized to pass these IB-specific arguments to the appropriate support package to complete the boot processing. The process begins at block 402 which illustrates the ib-boot support package receiving the boot arguments from system firmware. The ib-boot support package parses the boot arguments as shown at block 404, and determines at block 406 if the arguments indicate an IPoIB boot operation. If an IPoIB boot is indicated, the ib-boot support package creates the boot string for an IPoIB boot, as provided at block 408, and then the created boot string is forwarded to network support package 220, as shown at block 410. Thus, if the IBoIP network method is selected, the ib-boot package transfers control to network support package 220 and all the network structures are leveraged by the ib-boot support package.

If the boot arguments do not indicate an IPoIB boot, then a next determination is made at block 412 of whether the boot arguments indicate and SDP boot. If an SDP boot is indicated, again the ib-boot support package generates the boot string required for an SDP boot, as shown at block 414, and the generated boot string is forwarded to the SDP boot support package, as depicted at block 416. Thus, when the IB network method is selected, the ib-boot support package transfers control to the SDP support package or any other package that facilitates or provides direct file transport protocols over InfiniBand links.

Otherwise, if neither an IPoIB nor a SDP boot is indicated by the boot arguments, a final determination is made at block 418 whether an SRP boot is indicated. When an SRP boot is indicated, the ib-boot support package generates SRP specific boot arguments, as shown at block 420, and the ib-boot support package transfers the boot string to SRP support package 240 to complete the storage boot process, as indicated at block 422. When no specific boot method is indicated (or if multiple boot methods are indicated), an error is reported, as shown at block 424, and the boot process ends.

The processes by which the network support package and SDP support packages receive and process the boot arguments are described in detail within related patent application, Ser. No. 11/678,124, previously incorporated herein by reference. Those methods are not described in any further detail herein.

Figure 5:
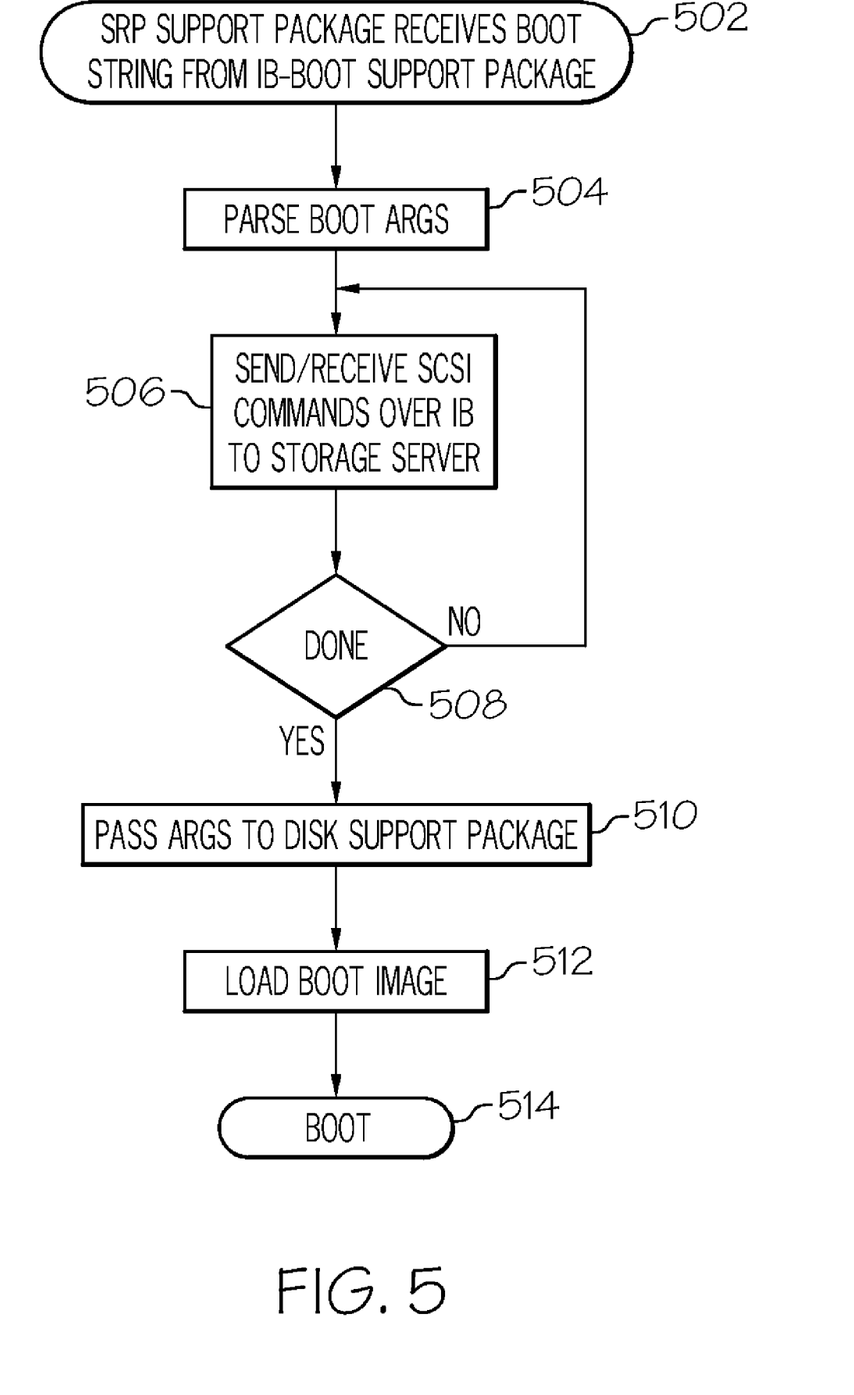
FIG. 5 illustrates an example process flow by which the SRP support package processes boot arguments received from the ib-boot support package and initiates access to the boot device and retrieve the boot image, according to one illustrative embodiment of the invention.

FIG. 5 is a flow chart depicting the processing of the boot arguments as performed by SRP support package 340 (FIG. 3), when transmission of TCP/IP messages over IB links (IPoIB) is utilized to load a boot file from a LAN server (such as boot server 150 of FIG. 1), according to one embodiment of the invention. Through the hierarchical nature of the I/O topology representation, read and write operations performed by the SRP support package are passed through to the ib-boot support package and are actually performed by the HCA device. The HCA device encapsulates SCSI commands and sends the commands to the specified IB target node via IB links. The process is further described with reference to the components of FIG. 3.

The process begins at block 502, which illustrates SRP support package 340 (FIG. 3) receiving the ib-boot arguments from ib-boot support package 310 (FIG. 3). SRP support package 240 parses the boot arguments, as shown at block 504, and then sends the SCSI commands over IB to storage server 164 (FIG. 3), as indicated at block 506. A determination is made at block 508 of whether transmission of the SCSI commands have been completed, and when the transmission has been completed, the specific load arguments are passed to disk support package 355 (FIG. 3) at block 510, and disk support package 355 causes the initiation of a boot process for booting the image file from the target disk (LUN 168). The target device (167/168) provides the boot image, which is loaded on the host computer 100, as shown at block 512. Then, the boot operation is undertaken and completed at host computer 100 (FIG. 1), as indicated at block 514.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, and CD ROMs.

While the invention has been particularly shown and described with reference to a preferred embodiment, it will be understood by those skilled in the art that various changes in form and detail may be made therein without departing from the spirit and scope of the invention.

What is claimed is:

1. In an InfiniBand (IB) network environment, a method for retrieving a boot image for an IB host device comprising:
   receiving a set of boot arguments including a command keyword;
   determining whether the command keyword is a first keyword, wherein the first keyword triggers utilization of a first support package that enables communication with a first boot server via a SCSI (Small Computer System Interface) protocol; and
   when the command keyword is the first keyword, automatically forwarding first-type boot arguments to the first support package, which is configured to respond to receipt of the first-type boot arguments by dynamically initiating access to a first storage device to retrieve the boot image from the first storage device utilizing the SCSI protocol;
   wherein the first keyword is srp, which specifies the SCSI RDMA (Remote Direct Memory Access) Protocol -- SRP-- support package, which utilizes SCSI communication methods to access the first boot server across an IB network.

2. The method of claim 1, wherein, when the command keyword is the first keyword, said method further comprises:
   on determining that the first keyword is within the set of boot arguments, generating a corresponding string of boot arguments and parameters for accessing a respective first storage device, said arguments utilized by the first support package identified by the first keyword; and
   forwarding the corresponding string of boot arguments and parameters to the first support package.

3. The method of claim 1, further comprising:
   generating initial boot arguments for the host device during system initialization, wherein a hierarchical representation of system components is generated, having therein a representation of an IB HCA (host channel adapter) along with children ibport devices identifying a location at which the boot image is located;
   extending the initial boot arguments with the first keyword to create the set of boot arguments, said first keyword indicating activation of an SRP boot method that provides SRP package transfer; and
   forwarding the set of boot arguments to an ib-boot support package to trigger selection of an appropriate boot method and initiate retrieval of the boot image via the selected boot method;
   wherein the ib-boot support package generates boot arguments that specify a target IB end node;
   wherein the ib-boot support package implements specific SCSI packet transfer protocols, utilized by hca device drivers when booting over the IB network; and
   wherein access operations, including read and write operations, performed by the SRP support package are passed through the ib-boot support package and are performed by the IB HCA.

4. The method of claim 3, further comprising:
   detecting, during system initialization, an hca device type, which represents an IB HCA;
   characterizing the hca device type with a node global unique identifier (node-GUID); and
   representing an ibport device within the hierarchical representation, wherein the ibport device includes a load interface to enable the ibport device to be utilized as a boot device;
   wherein the IB HCA encapsulates SRP messages and transmits the commands and messages to a specified IB target node via IB links.

5. The method of claim 1, further comprising:
   generating, at the SRP support package, a boot string representing parameters required for accessing the storage device; and
   forwarding the boot string to a disk support package of a server that is associated with the storage device.

6. The method of claim 5, wherein the storage device is a child of the server and is accessible via the parameters within the boot string, said method further comprising:
   loading the boot image from the storage device; and
   forwarding the boot image to the IB host device via the SCSI RDMA (Remote Direct Memory Access) Protocol enabling communication over the IB network.

7. An InfiniBand (IB) host device configured to retrieve a boot image comprising:
   means for coupling to a host channel adapter (HCA) of an IB network;
   means for receiving a set of boot arguments including a command keyword;
   means for determining whether the command keyword is a first keyword, wherein the first keyword triggers utilization of a corresponding first support package that enables communication with a first boot server via an SCSI (Small Computer System Interface) protocol; and
   when the command keyword is the first keyword, means for automatically forwarding first-type boot arguments to the first support package, which is configured to respond to receipt of the first-type boot arguments by dynamically initiating access to a first storage device to retrieve the boot image from the first storage device utilizing the SCSI protocol;
   wherein the first keyword is srp, which specifies the SCSI RDMA (Remote Direct Memory Access) Protocol -- SRP-- support package. which utilizes SCSI communication methods to access the first boot server across the IB network.

8. The IB host device of claim 7, wherein, when the keyword is the first keyword, the device further comprises:
   on determining that the first keyword is within the set of boot arguments, means for generating a corresponding string of boot arguments and parameters for accessing the first storage device, said arguments utilized by the first support package identified by the first keyword; and
   means for forwarding the corresponding string of boot arguments and parameters to the first support package.

9. The IB host device of claim 7, further comprising:
   means for generating initial boot arguments for the host device during system initialization, wherein a hierarchical representation of system components is generated, having therein a representation of an IB HCA (host channel adapter) along with children ibport devices identifying a location at which the boot image is located;
   means for extending the initial boot arguments with the first keyword to create the set of boot arguments, said first keyword indicating activation of an SRP boot method that provides SRP package transfer; and
   means for forwarding the set of boot arguments to an ib-boot support package to trigger selection of an appropriate boot method and initiate retrieval of the boot image via the selected boot method;
   wherein the ib-boot support package generates boot arguments that specify a target IB end node;
   wherein the ib-boot support package implements specific SCSI packet transfer protocols, utilized by hca device drivers when booting over the IB network; and wherein access operations, including read and write operations, performed by the SRP support package are passed through the ib-boot support package and are performed by the IB HCA.

10. The IB host device of claim 7, further comprising:
means for detecting, during system initialization, an hca device type, which represents an IB HCA;
means for characterizing the hca device type with a node global unique identifier (node-GUID); and
means for representing an ibport device within an hierarchical representation of system components, wherein the ibport device includes a load interface to enable the ibport device to be utilized as a boot device;
wherein the IB HCA encapsulates SRP messages and transmits the commands and messages to a specified IB target node via IB links.

11. The IB host device of claim 7, further comprising:
means for generating, at the SRP support package, a boot string representing parameters required for accessing the storage device; and
means for forwarding the boot string to a disk support package of a server that is associated with the storage device.

12. The IB host device of claim 11, wherein the storage device is a child of the server and is accessible via the parameters within the boot string, said device further comprising:
means for loading the boot image from the storage device; and
means for forwarding the boot image to the IB host device via the SCSI RDMA protocol enabling communication over the IB network.

13. An IB network having an IB host device configured to retrieve a boot image comprising:
means for coupling to a host channel adapter (HCA) of an IB network;
means for receiving a set of boot arguments including a command keyword;
means for determining whether the command keyword is a first keyword, wherein the first keyword triggers utilization of a corresponding first support package that enables communication with a first boot server via an SCSI (Small Computer System Interface) protocol; and
when the command keyword is the first keyword, means for automatically forwarding first-type boot arguments to the first support package, which is configured to respond to receipt of the first-type boot arguments by dynamically initiating access to a first storage device to retrieve the boot image from the first storage device utilizing the SCSI protocol;
wherein the first keyword is srp, which specifies the SCSI RDMA (Remote Direct Memory Access) Protocol -- SRP-- support package. which utilizes SCSI communication methods to access the first boot server across the IB network;
wherein IB host device further comprises:
a switch having links for connecting components within the IB network;
an end node connected to the switch via one of said links; and
a boot device connected to the end node via one of a direct SCSI connection or a storage area network (SAN) coupled to the end node of the IB network.

14. A computer program product for retrieving a boot image for an InfiniBand (IB) host device comprising:
a computer readable storage medium; and
program code on the computer readable storage medium that when executed provides the functions of:
receiving a set of boot arguments including a command keyword;
determining whether the command keyword is a first keyword, wherein the first keyword triggers utilization of a corresponding first support package that enables communication with a first boot server via an SCSI (Small Computer System Interface) protocol; and
when the command keyword is the first keyword, automatically forwarding first-type boot arguments to the first support package, which is configured to respond to receipt of the first-type boot arguments by dynamically initiating access to a first storage device to retrieve the boot image from the first storage device utilizing the SCSI protocol;
wherein the first keyword is srp, which specifies the SCSI RDMA (Remote Direct Memory Access) Protocol -- SRP-- support package, which utilizes SCSI communication methods to access the first boot server across an IB network; and
when the command keyword is the first keyword, said program code further comprises code for:
on determining that the first keyword is within the set of boot arguments, generating a corresponding string of boot arguments and parameters for accessing a respective first storage device, said arguments utilized by the first support package identified by the first keyword; and
forwarding the corresponding string of boot arguments and parameters to the first support package.

15. The computer program product of claim 14, wherein said program code further comprises code for:
generating, initial boot arguments for the host device during system initialization, wherein a hierarchical representation of system components is generated, having therein a representation of an IB HCA (host channel adapter) along with children ibport devices identifying a location at which the boot image is located;
extending the initial boot arguments with the first keyword to create the set of boot arguments, said first keyword indicating activation of an SRP boot method that provides SRP package transfer; and
forwarding the set of boot arguments to an ib-boot support package to trigger selection of an appropriate boot method and initiate retrieval of the boot image via the selected boot method;
wherein the ib-boot support package generates boot arguments that specify a target IB end node;
wherein the ib-boot support package implements specific SCSI packet transfer protocols, utilized by hca device drivers when booting over the IB network; and
wherein access operations, including read and write operations, performed by the SRP support package are passed through the ib-boot support package and are performed by the IB HCA.

16. The computer program product of claim 14, further comprising program code for:
detecting, during system initialization, an hca device type, which represents an IB HCA;
characterizing the hca device type with a node global unique identifier (node-GUID); and
representing an ibport device within the hierarchical representation, wherein the ibport device includes a load interface to enable the ibport device to be utilized as a boot device;
wherein the IB HCA encapsulates SRP messages and transmits the commands and messages to a specified IB target node via IB links.

17. The computer program product of claim 16, further comprising program code that when executed provides the functions of:

generating, at the SRP support package, a boot string representing parameters required for accessing the storage device; and forwarding the boot string to a disk support package of a server that is associated with the storage device; wherein, when the storage device is a child of the server and is accessible via the parameters within the boot string:

loading the boot image from the storage device; and forwarding the boot image to the IB host device via the SCSI RDMA protocol enabling communication over the IB network.

\* \* \* \* \*